United States Patent [19]
Nishikawa

[11] Patent Number: 6,085,854
[45] Date of Patent: *Jul. 11, 2000

[54] BATTERY FRAME STRUCTURE FOR ELECTRIC MOTORCAR

[75] Inventor: Masaharu Nishikawa, Hadano, Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/570,968

[22] Filed: Dec. 12, 1995

[30] Foreign Application Priority Data

Dec. 13, 1994 [JP] Japan ................................ 6-308951
Dec. 15, 1994 [JP] Japan ................................ 6-311698

[51] Int. Cl.$^7$ ...................................................... B60K 1/04
[52] U.S. Cl. ..................... 180/68.5; 211/126.2; 429/100
[58] Field of Search .................... 429/96, 99, 83, 429/100, 148; 180/68.5, 65.2; 211/126.2

[56] References Cited

U.S. PATENT DOCUMENTS

| | | | |
|---|---|---|---|
| 1,079,709 | 11/1913 | Lloyd | 180/68.5 |
| 1,081,706 | 12/1913 | Thompson | 180/68.5 |
| 2,104,765 | 1/1938 | Saunders | 180/68.5 |
| 2,104,768 | 1/1938 | Saunders | 180/68.5 |
| 2,104,769 | 1/1938 | Saunders | 180/68.5 |
| 4,107,402 | 8/1978 | Dougherty et al. | 429/148 X |
| 4,339,015 | 7/1982 | Fowkes et al. | 180/68.5 X |
| 4,365,681 | 12/1982 | Singh | 180/68.5 |
| 4,976,327 | 12/1990 | Abujudom, II et al. | 180/68.5 X |
| 5,015,545 | 5/1991 | Brooks | 180/68.5 X |
| 5,031,712 | 7/1991 | Karolek et al. | 180/68.5 X |
| 5,272,990 | 12/1993 | Carter | 108/51.3 |
| 5,320,190 | 6/1994 | Naumann et al. | 180/68.5 X |
| 5,390,754 | 2/1995 | Masuyama et al. | 180/68.5 |
| 5,392,873 | 2/1995 | Masuyama et al. | 429/148 X |
| 5,456,994 | 10/1995 | Mita | 429/148 X |
| 5,501,289 | 3/1996 | Nishikawa et al. | 180/68.5 |
| 5,510,203 | 4/1996 | Hamada et al. | 429/148 X |
| 5,513,721 | 5/1996 | Ogawa et al. | 180/220 |
| 5,585,205 | 12/1996 | Kohchi | 180/68.5 X |
| 5,800,942 | 9/1998 | Hamada et al. | 429/148 |

*Primary Examiner*—Michael Mar
*Attorney, Agent, or Firm*—Foley & Lardner

[57] ABSTRACT

A battery frame structure for mounting b thereon for an electric vehicle is provided. The structure includes an outer frame, an inner frame and a bottom plate. The outer frame includes a front frame element, a rear frame element, a left frame element and a right frame element. The inner frame longitudinal frame elements and transverse frame elements. The transverse frame elements are mounted on the longitudinal frame elements, so that a draft passage for cooling fluid is defined under the transverse frame elements.

9 Claims, 13 Drawing Sheets

BATTERY FRAME STRUCTURE FOR ELECTRIC MOTORCAR

BACKGROUND OF THE INVENTION

1. Technical Field

The present invention relates to a battery frame structure for an electric motorcar.

2. Description of the Related Art

In the general electric motorcar, batteries loaded thereon account for considerable weight and load space. In order to mount the batteries, hitherto, an exclusive frame of rigid structure, which will be referred as battery frame" hereinafter, has been arranged under a vehicle floor. Further, being mounted on the battery frame, a plurality of batteries have been arranged between the vehicle floor and the battery frame in a sealed manner.

With such an arrangement as mentioned above, the battery function is influenced and lowered by the batteries' heatup. In order to avoid such a problem, there have been disclosed Japanese Unexamined Patent Publications (Kokai) Nos. 52-35023 and 5-193366 etc. in which cooling fluid, e.g. air, is introduced into the battery frame through a front section thereof is discharged from a rear section thereof so that the batteries contained therein are cooled down by the flow of fluid.

In the so-constructed arrangement, however, the batteries are mounted on a bottom plate attached on the battery frame, it is hard to direct the cooling fluid toward the bottom side of the batteries sufficiently. Furthermore, since the temperature of the cooling fluid is increased before it reaches some batteries at the rear, it is impossible to cool the every battery loaded on the battery frame uniformly. In particular, in case of highly efficient batteries utilizing lithium ion or the like as a main constituent, effective cooling would not be expected because of the heat such batteries generate.

Now, the battery frame generally includes an outer frame consisting of a front frame element, a rear frame element, a left frame element and a right frame element, and a bottom plate for closing an inside bottom of the outer frame. In the so-constructed battery frame, the bottom surface of the outer frame is at the plane with of bottom plate. Therefore, if the battery frame interferes with a road surface accidentally, both the bottom surface of the outer frame and the bottom plate would be in contact with the road surface, so that the batteries on the bottom plate may be damaged.

SUMMARY OF THE INVENTION

It is therefore an object of the present invention to provide a battery frame structure for an electric motorcar, which is capable of cooling each of the individual batteries accommodated in the battery frame and which is capable of introducing cooling fluid to the batteries at the rear without increasing the temperature of the fluid remarkably, whereby it is possible to cool all the batteries uniformly for further improvement of the cooling effect.

It is also an object of this invention to provide a battery frame structure for an electric motorcar, which is capable of avoiding the interference with the road surface thereby to prevent the batteries from being damaged.

The former object of the invention described above can be accomplished by a battery frame structure for mounting batteries thereon for an electric motorcar, comprising:

an outer frame composed of a front frame element, a rear frame element, a left frame element and a right frame element;

an inner frame composed of longitudinal frame elements extending in the direction of length of the electric motorcar and transverse frame elements extending in the direction of width of the electric motorcar, the longitudinal frame elements and the transverse frame elements dividing an inside of the outer frame in a lattice manner; and a bottom plate attached to the inner frame for closing an inside bottom part thereof;

wherein the transverse frame elements are mounted on the longitudinal frame elements, whereby draft passages for cool wind flowing from a front side of the battery frame structure to the rear side are defined under the transverse frame elements.

With the arrangement mentioned above, since the cool fluid introduced into the battery frame structure through the front side forms main streams in the draft passage defined by the longitudinal frame elements. Between the respective transverse frame elements, separate streams are produced from each main stream to ascend through the batteries and thereafter, these streams are discharged out of the battery frame structure. Consequently, it is possible to supply the respective batteries from the front to the rear with the fresh cooling fluid which has not been subjected to heat-exchange yet. Thus, it allows each of the batteries to be cooled down uniformly, so that it is possible to improve the cooling effect for the batteries remarkably.

In the present invention, preferably, the transverse frame elements have flanges formed at both lower edges thereof on the front and rear sides to mount the batteries thereon, while each of the longitudinal frame elements has notches formed at intersections thereof with the transverse frame elements, each of the notches being of depth larger than a thickness of each of the flanges. Further, it is preferable that the transverse frame elements are engaged and fixed in the notches of longitudinal frame elements.

In such a case, the respective batteries are arranged in position along the longitudinal direction of the electric motorcar by the flanges and the respective upper edges of the longitudinal frame elements are arranged higher than the flanges since the transverse frame elements are engaged in the notches of the longitudinal frame elements. Thus, the batteries can be also arranged in position along the transverse direction by the longitudinal frame elements, so that it is possible to fix the batteries on the battery frame structure firmly, excluding movement of the battery in any direction.

More preferably, the transverse frame elements-and the front and rear frame elements are particularly slanted with respect to the bottom plate so as to mount the batteries obliquely to the bottom plate.

In this case, each of the separate streams flowing in the draft passages are directed obliquely upward approaching the batteries at substantial right angles. Consequently, the cooling fluid is spread over every part of the batteries thereby to improve the cooling effect on the batteries It is preferable that the bottom plate is provided below the batteries with deflecting members for deflecting upward a flow of the cooling fluid flowing in the draft passage.

With this arrangement, the cooling fluid flowing in the draft passage below the batteries is deflected upward by the deflecting members. Thus, since the deflected streams approach the batteries at substantial right angles, it allows the cooling fluid to be spreaded over every part of the batteries thereby to further improve the cooling effect on the batteries.

The latter object of the invention described above can be accomplished by a battery frame structure for mounting batteries thereon for an electric motorcar, comprising:

an outer frame composed of a front frame element, a rear frame element, a left frame element and a right frame element;

a center frame lying between the front frame element and the rear frame element inside the outer frame, an inner frame arranged inside of the outer frame for dividing space surrounded by the outer frame of the center frame in a lattice manner; and a bottom plate attached to the inner frame for closing an inside bottom part thereof;

wherein a portion of the bottom plate surrounded by at least the outer frame and the center frame is arranged higher than respective bottom surfaces of the outer frame and the center frame.

With the arrangement mentioned above, the height of the bottom plate above the road surface is established to be greater than that of the outer frame or the center frame. Therefore, if the battery frame interferes with the road surface during the vehicle's traveling, the bottom surfaces of the outer frame and the center frame would first contact the road surface. In such a case, a driver of the vehicle can feel the interference with the road surface and begin to stop the vehicle. Accordingly, it is possible to avoid the interference of the bottom plates with the road surface, so that damage to the batteries can be prevented.

In the present invention, preferably, the inner frame is composed of longitudinal frame elements in the direction of length of the electric motorcar and transverse frame elements extending in the direction of width of the electric motorcar and preferably, the longitudinal frame elements are mounted on the transverse frame elements.

In such a case, a plurality of spaces are defined about the longitudinal frame elements and the transverse frame elements, so that it is possible to promote the flow of the cooling fluid introduced through the front side of the battery frame. In addition, it is possible to direct the cooling fluid along the longitudinal frame elements backward and smoothly, whereby the cooling effect on the batteries can be remarkably improved. Further, with the arrangement, it is possible to shorten the welding spans required for assembling the lattice of the frame elements and to reduce the torsion of the frame due to welding strain of the inner frame, so that the forming accuracy of the battery frame structure is improved. In connection, the coordination of the upper face of the battery frame structure with a battery cover or a vehicle floor becomes better thereby to improve sealing capability therebetween.

More preferably, the front frame element is provided at a front lower edge thereof with a rounded chamfer and the rear frame element is provided at a rear lower edge thereof with a rounded chamfer.

In this case, owing to the rounded chamfers, it is possible to avoid the "flying-up" phenomenon of water, which occurs when a vehicle is traveling on a road covered with water, forward or backward, by the chamfers' downward guiding of water. Therefore, it is possible to prevent the battery frame structure from being submerged by the water thereby to improve the sealing capability. In addition, at the interference with the road surface, the front frame element or the rear frame element can get over an obstacle on the road surface more smoothly, thereby reducing the damage on the battery frame structure.

In the invention, more preferably, the outer frame is shaped as a planner quadrilateral. Also in this case, it is possible to shorten the welding spans required for assembling the lattice of the frame elements and to reduce the torsion of frame due to welding strain of the inner frame, so that the forming accuracy of the battery frame structure is improved.

These and other objects and features of the present invention will become more fully apparent from the following description and appended claims taken in conjunction with the accompanying drawings.

DESCRIPTION OF THE PREFERRED EMBODIMENT

A variety of embodiments of the present invention will be described with reference to the drawings.

Figure 1:
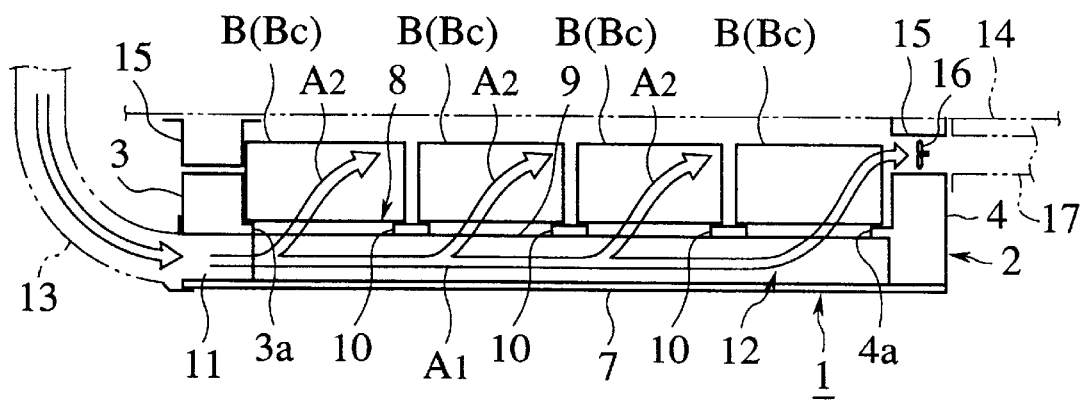
FIG. 1 is a cross sectional view showing a battery frame structure in accordance with a first embodiment of the present invention.
Figure 2:
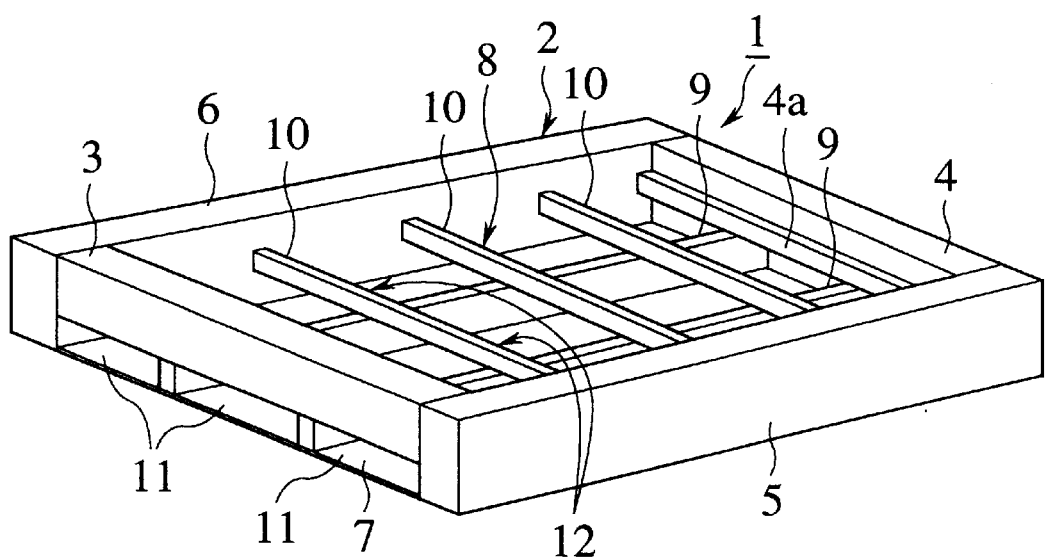
FIG. 2 is a perspective view showing the battery frame structure of FIG. 1.

FIGS. 1 and 2 show the first embodiment of the present invention.

In FIGS. 1 and 2, reference numeral 1 designates a battery frame structure for a not-shown electric motorcar, which carries a plurality of batteries B as a power source of the motorcar. Note, in this specification, this battery frame structure 1 will be referred to as "battery frame" hereinafter.

The battery frame 1 comprises an outer frame 2, a bottom plate 7 for closing an inside bottom of the outer frame 2 and an inner frame 8. The outer frame 2 consists of a front frame element 3, a rear frame element 4, a left frame element 5 and a right frame element 6 extending in the direction of travel of the motorcar On the other hand, the inner frame 8 is composed of a plurality of frame elements 9 in the direction of length of the motorcar, which will be referred as longitudinal frame elements" hereinafter, and a plurality of frame elements 10 extending in the direction of width of the motorcar, which will be referred as transverse frame elements" hereinafter. These frame elements 9 and 10 are arranged so as to divide a space inside of the outer frame 2 in a lattice manner.

Beneath the front frame element 3 of the outer frame 2, an air inlet 11 is formed to communicate with an air intake duct 13. The transverse frame elements 10 of the inner frame 8 are connected on the longitudinal frame elements 9 to define draft passages 12, which communicates with the air inlet 11, under the batteries B in the longitudinal direction of the battery frame 1.

The batteries B are constituted by a plurality of cells Bc gathered and fixed to each other. Adjacent to the front and rear frame elements 3 and 4, the batteries B are mounted across battery mounting shelves 3a and 4a and upper surfaces of the frame elements 10. At the intermediate portion of the battery frame 1, the batteries B are mounted across the neighboring frame elements 10 in the longitudinal direction. Theses batteries B are fixed to the battery frame 1 by any clamping means (not shown in the figure).

As shown in FIG. 1, the battery frame 1 is fastened to floor members 15 beneath a vehicle floor 14 by bolts/nuts or the like (not shown) through sealant, so that the batteries B are closely accommodated between the battery frame 1 and a lower surface of the vehicle floor 14. The floor member 15, which is arranged corresponding to the rear frame element 4 of the outer frame 2, is provided with a fan 16 and a discharge duct 17 for discharging the cooling fluid.

With the above-mentioned structure, cooling fluid introduced into the batter frame 1 through the air intake duct 13 and the air inlet 11 forms main streams A1 in the draft passages 12 defined by the longitudinal frame elements 9. Between the transverse frame elements 10 and 10, separate streams A2 are produced from each main stream A1 and ascend from the underside of the batteries B through each cell Bc. These streams A1 and A2 are discharged through the fan 16 and the discharge duct 17 finally.

Consequently, it is possible to supply the respective batteries B from the front to the rear with fresh cooling fluids which has not been subjected to heat-exchange yet. Thus, it allows each of the batteries B to be cooled down, so that it is possible to improve the cooling effect for the batteries remarkably.

Figure 3:
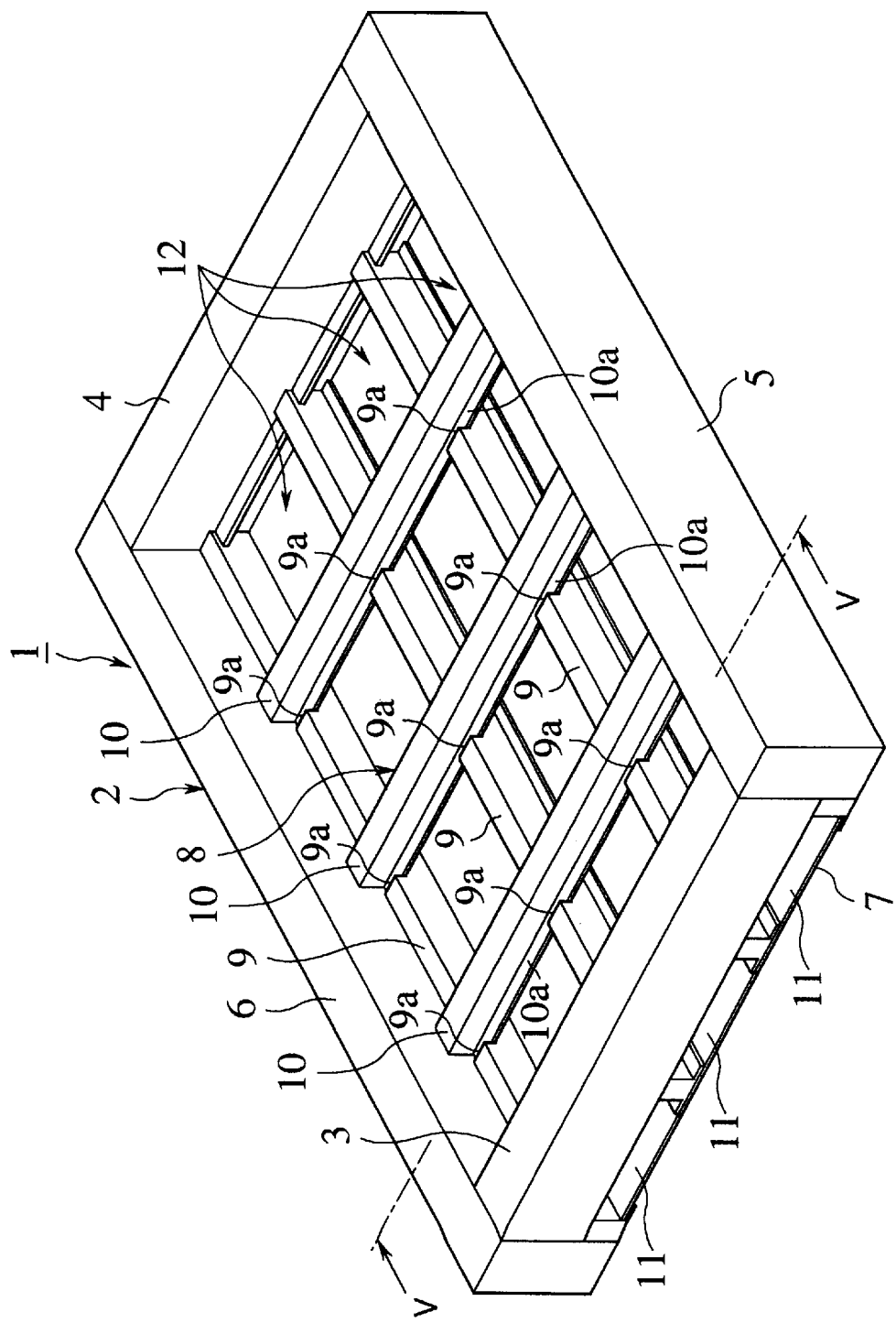
FIG. 3 is a cross sectional view showing a battery frame structure in accordance with a second embodiment of the present invention.
Figure 4:
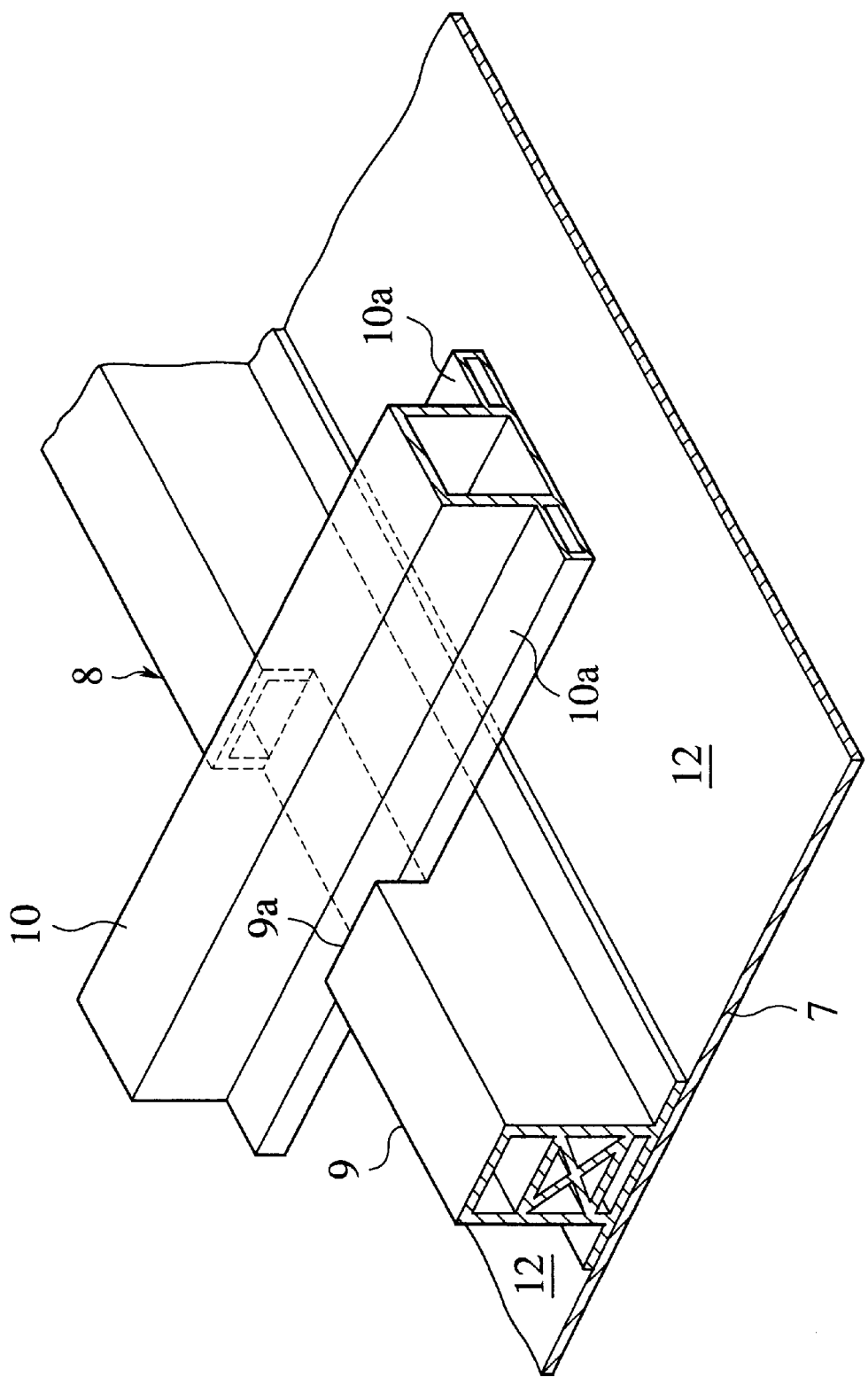
FIG. 4 is a perspective view showing an assembling condition of an inner frame of the battery frame structure of FIG. 3.
Figure 5:
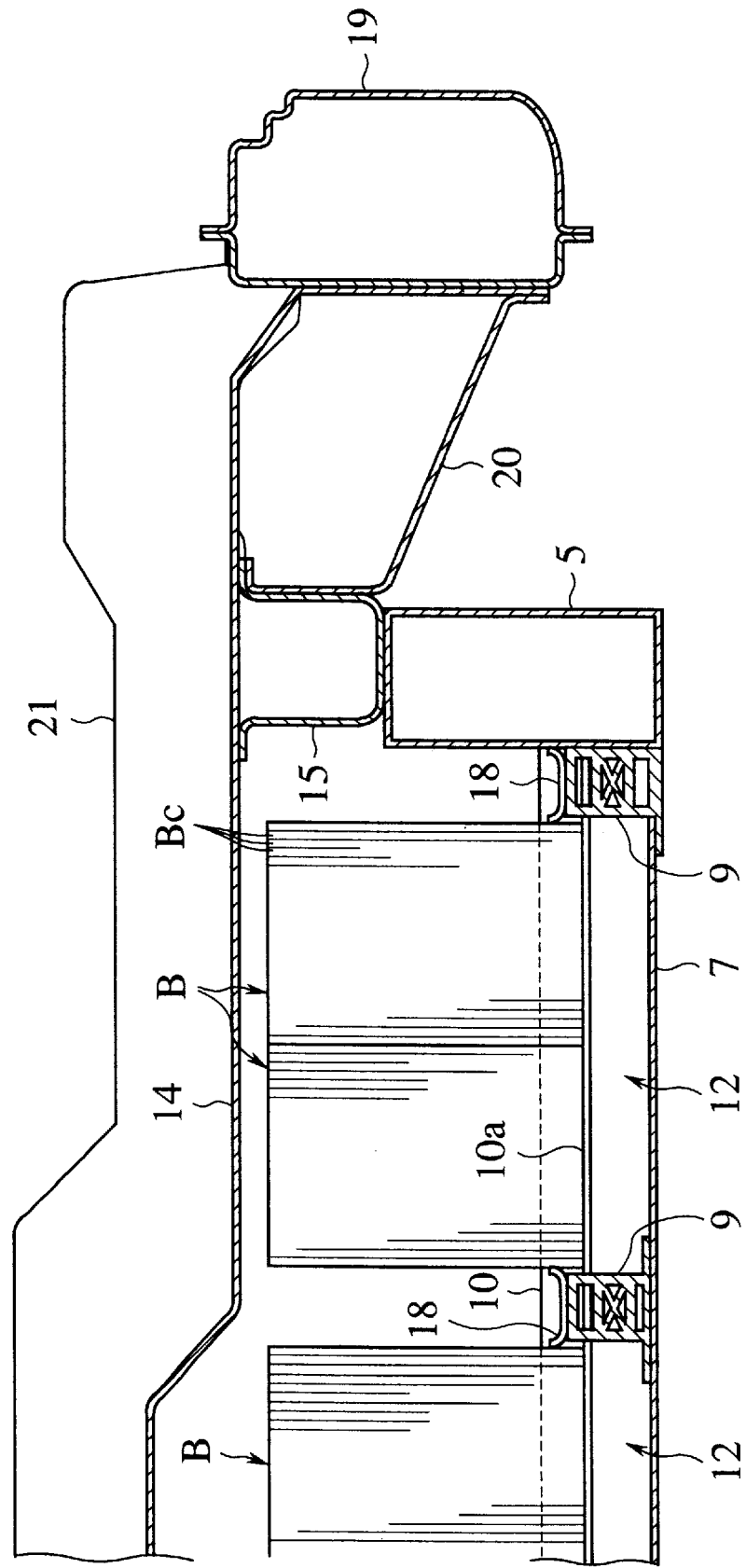
FIG. 5 is a cross sectional view of the battery frame structure of FIG. 3, taken along a line of V—V therein.

FIGS. 3 to 5 show the second embodiment of the invention. In the figures, the elements similar to those of the first embodiment are indicated by the same reference numerals.

In the embodiment, each transverse frame element 10 is provided on front and rear sides thereof with "battery-mounting" shelves 10a in form of flanges of the frame on which the batteries B are mounted and clamped down.

On the other hand, each of the longitudinal frame elements 9 is provided at sections intersecting the transverse frame elements 10 with notches 9a each of which has a depth larger than the thickness (height) of the battery-mounting shelf 10a. During assembly, each of the transverse frame elements 10 is engaged in at least one notch 9a and joined to at least one of the frame elements 9.

On the upper surface of the longitudinal frame elements 9, seal members 18 are arranged for sealing a clearance between the battery B and the adjoining battery B and clearances between the battery B and the left and right frames 5 and 6, so that all the cooling fluid introduced into the draft passages 12 flows among the cells Bc of the respective batteries B to cool them effectively.

In FIG. 5, reference numeral 19 denotes a side sill, reference numeral 20 denotes an outrigger for connecting the floor member 15 with the side sill 20, and reference numeral 21 denotes a cross member which is arranged on the vehicle floor 14.

According to the embodiment, the respective batteries B are arranged in position along the longitudinal direction of the motorcar by the battery-mounting shelves 10a and the respective upper edges of the longitudinal frame elements 9 are arranged higher than the shelves 10a since the transverse frame elements 10 are engaged in the notches 9a of the longitudinal frame elements 9. Therefore, the batteries B can be arranged in position of the transverse direction by the frame elements 8, 50 that it is possible to fix the batteries B on the battery frame 1 firmly, excluding movement of the batteries B in any direction.

Figure 6:
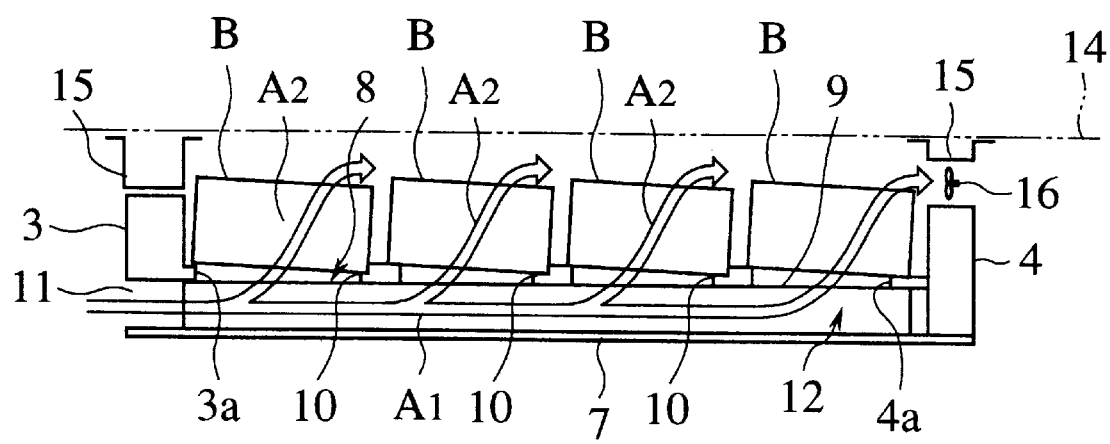
FIG. 6 is a cross sectional view showing a battery frame structure in accordance with a third embodiment of the present invention.
Figure 7:
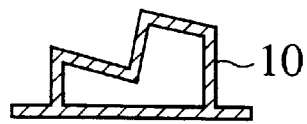
FIG. 7 is a cross sectional view of a transverse frame element of FIG. 6.

The third embodiment of the invention is shown in FIGS. 6 and 7. In the embodiment, each transverse frame element 10 is shaped like a step with a front portion thereof lower than the rear portion. Further, the respective upper surfaces of the front and rear portions of the frame element 10 are slanted so that the height of each surface gradually decreases toward the rear of the battery frame 1. Similarly, the battery-mounting surfaces 3a and 4a of the front and rear frames 3 and 4 are slanted so that the height of each surface gradually decreases toward the rear of the battery frame 1.

With the arrangement mentioned above, since all the batteries B are mounted on the battery frame 1 in a so-called backward-slanted" condition, each separate stream A2, which rises from the draft passage 12 obliquely upward, approaches the battery B at substantially a right angle to a longitudinal direction thereof. Consequently, it is possible for cooling fluid to reach every part of the battery B for the improvement of the cooling effect.

Figure 8:
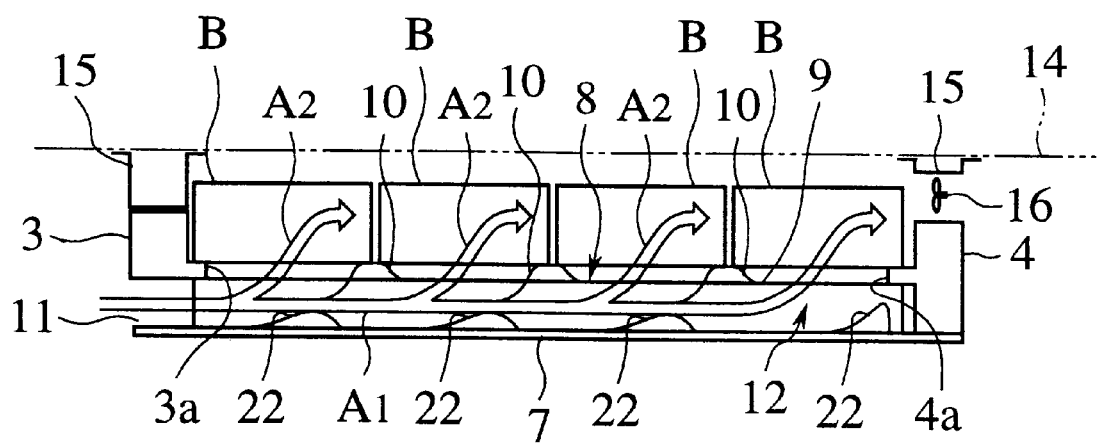
FIG. 8 is a cross sectional view showing a battery frame structure in accordance with a fourth embodiment of the present invention.
Figure 9:
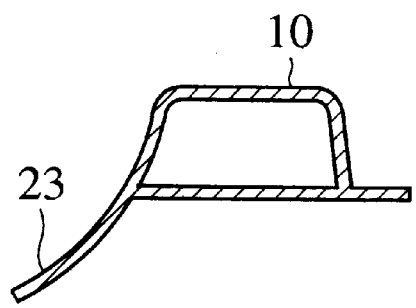
FIG. 9 is a cross sectional view of a transverse frame element of FIG. 8.

We describe the fourth embodiment of the invention with reference to FIGS. 8 and 9.

According to the embodiment, there are provided a plurality of deflecting members 22 on the bottom plate 7, which divert a portion of the flow of the cooling fluid in the draft passage 12 upward. Note that the deflecting members 22 may be secured on the bottom plate 7. Alternatively, the bottom plate 7 itself may be embossed so as to have deflecting members 22. Furthermore, in order to guide the rising separate streams A2 smoothly, each transverse frame element 10 is provided on the front side with a curved fin 23.

Also in this embodiment, since the cooling fluid flowing in the draft passage 12 is diverted upward by the deflecting members 22, the resulting separated stream A2 approaches the battery B at substantially a right angle. Consequently, it allows the cooling fluid to be spreaded over every part of the batteries B thereby improving the cooling effect on the batteries B.

We describe the fifth embodiment of the invention with reference to FIGS. 10 to 15.

In the figures, reference numeral 31 designates a battery frame provided with a bottom, which carries a plurality of batteries B. The battery frame 31 includes an outer frame 32 consisting of a front frame element 33, a rear frame element 34, a left frame element 35 and a right frame element 36. The frame 31 further includes a center frame 37 which lies between the front frame element 33 and the rear frame element 34 inside the outer frame 32, a bottom plate 38 for closing an inside bottom of the outer frame 32, and an inner frame 39 which consists of transverse frame elements 40 and longitudinal frame elements 41 for dividing an inside space defined between the outer frame 32 and the center frame 37 in a lattice manner.

All of the front and rear frame elements 33 and 34, the left and right frame elements 35 and 36, the center frame 37 and the frame elements 40 and 41 are made of lightweight metal such as aluminum alloy and formed in a of rectangular closed section by an extruder.

In the embodiment, upon putting end faces of the front and rear frame elements 33 and 34 opposite side faces of the right and left frame elements 35 and 36, the peripheries of the frame elements are welded to each other so as to make the outer frame 32 to be a planer quadrilateral.

The front and rear frame elements 33 and 34 are provided at lower edges of inside walls thereof with battery-mounting shelves 33a and 34a of closed sections, respectively. Being formed to extend along the longitudinal direction of the elements 33 and 34, the battery-mounting shelves 33a and 34a are provided at respective lower edges thereof with flanges 33b and 34b which are on the same level with the bottom face of the battery frame 31.

Similarly, the left and right frame elements 35 and 36 are provided at lower edges of inside walls thereof with frame-mounting shelves 35a and 36a of closed sections, which are lower than the frame-mounting shelves 33a and 34a, respectively. Being formed to extend along the longitudinal direction of the frame elements 35 and 36, the frame-mounting shelves 35a and 36a are provided at respective lower edges thereof with flanges 35b and 35b which are also on the same level with the bottom face of the battery frame 31.

Being arranged lower than the outer frame 32, the center frame 37 is fixed to the front and rear frame elements 33 and 34 by welding the frame 37 opposite side faces to the frame elements 33 and 34. The center frame 37 is provided at lower edges of opposing side walls thereof with frame-mounting shelves 37a of closed section, which are level with the frame-mounting shelves 35a and 36a. Being formed to extend along the longitudinal direction of the center frame 37, the frame-mounting shelves 37a are provided at respective lower-edges thereof with flanges 37b and 37b which are also on the same level with the bottom face of the battery frame 31.

In the embodiment, the bottom plate 38 is divided into two pieces where the center frame 37 is positioned. The periphery of the plate 38 is overlapped with the flanges 33b, 34b, 35b and 36b and the flange 37b of the center frame 37 and secured thereto by appropriate mechanical clinching means 42 such as crimping, bolt/nut fixing etc.

Figure 10:
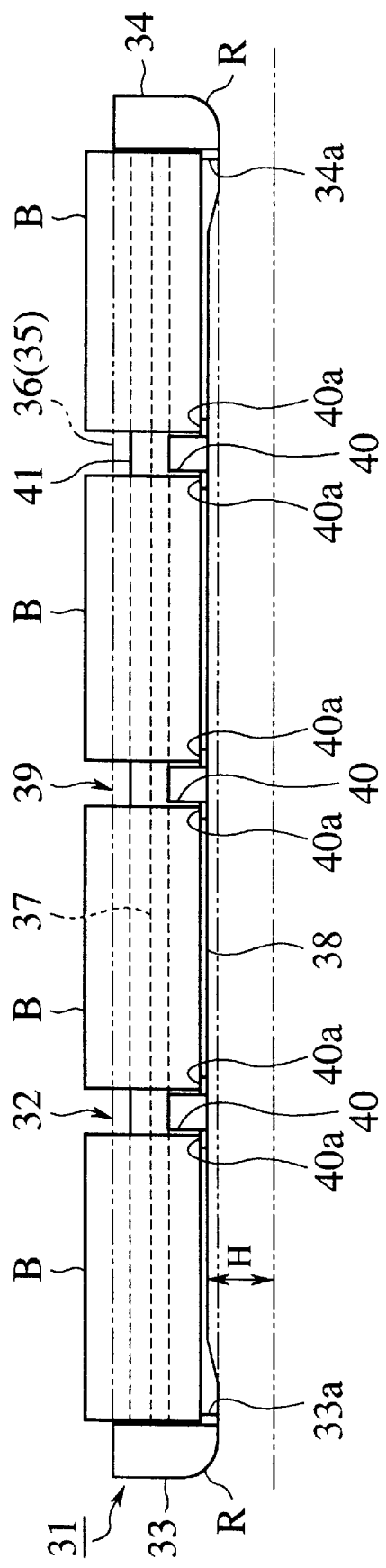
FIG. 10 is a cross sectional view of a battery frame structure in accordance with a fifth embodiment of the present invention, taken along a line of X—X of FIG. 12.
Figure 11:
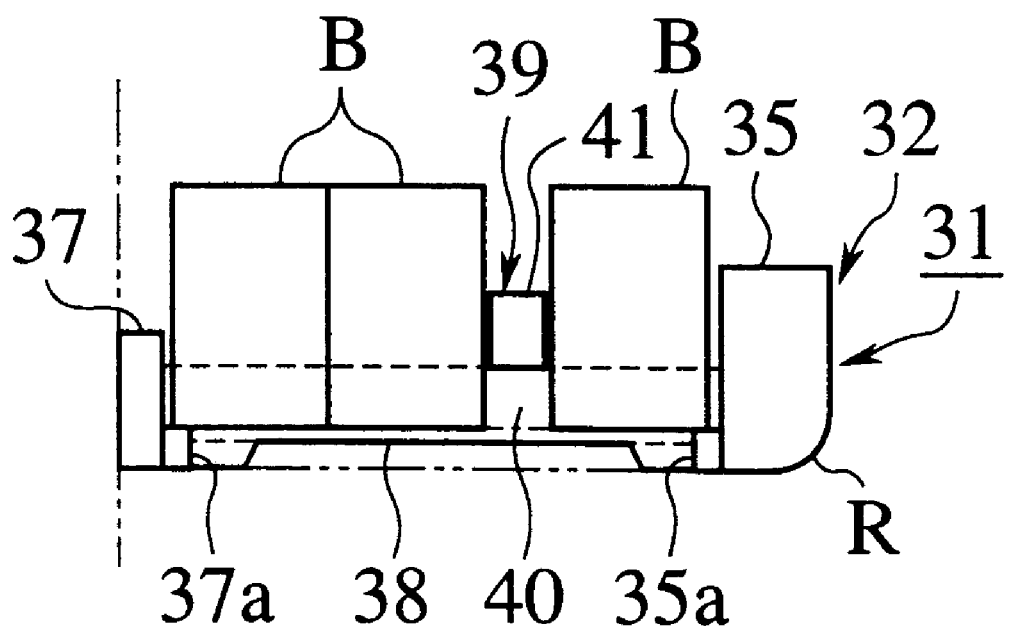
FIG. 11 is a cross sectional view of the battery frame structure in accordance with the fifth embodiment, taken along a line of XI—XI of FIG. 12.
Figure 12:
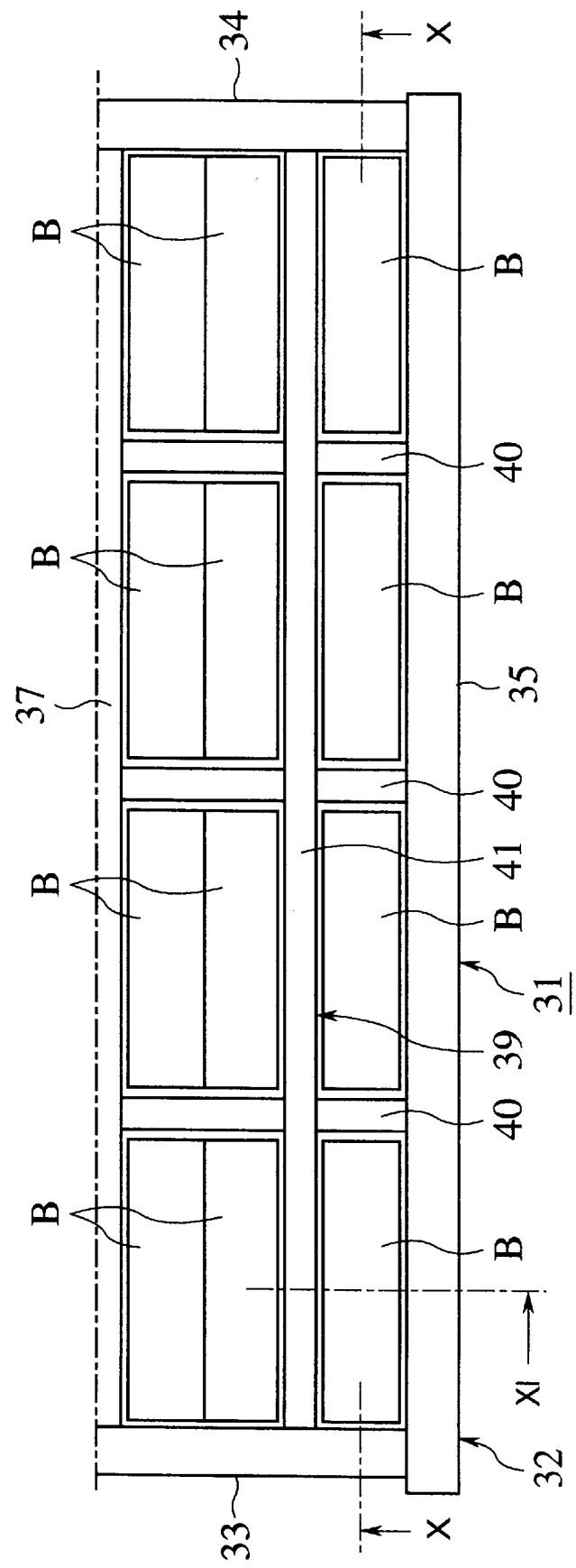
FIG. 12 is a plan view showing a half section of the battery frame of the fifth embodiment of the present invention.

The bottom plate 38 is step-shaped so that a central portion thereof is higher than the peripheral fixed portion by an appropriate value. That is, as shown in FIG. 10, the height H of the bottom plate 38 from the road surface is established to be larger than the height of the outer frame 32 or the center frame 37.

Figure 13:
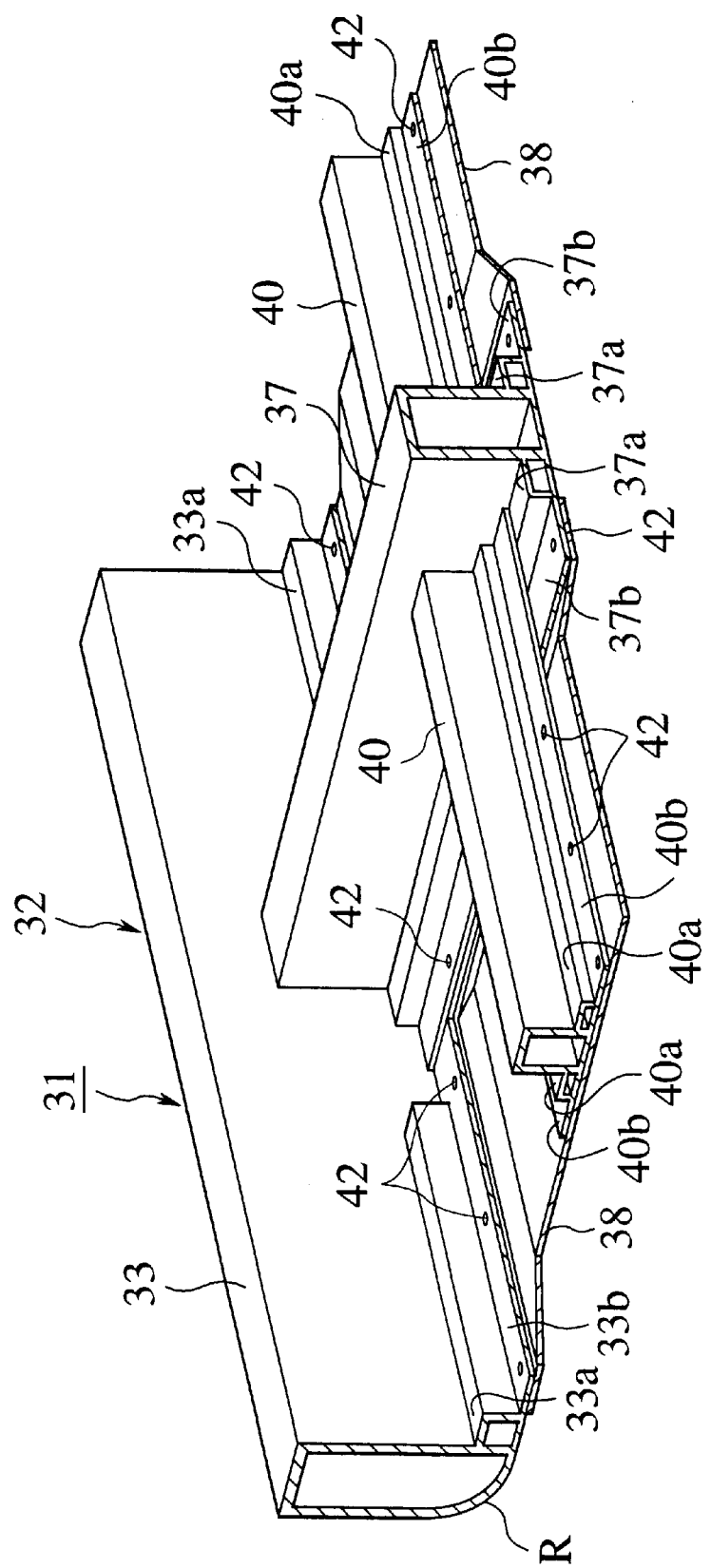
FIG. 13 is a perspective view showing a connection of a front frame with a center frame of FIG. 12.
Figure 14:
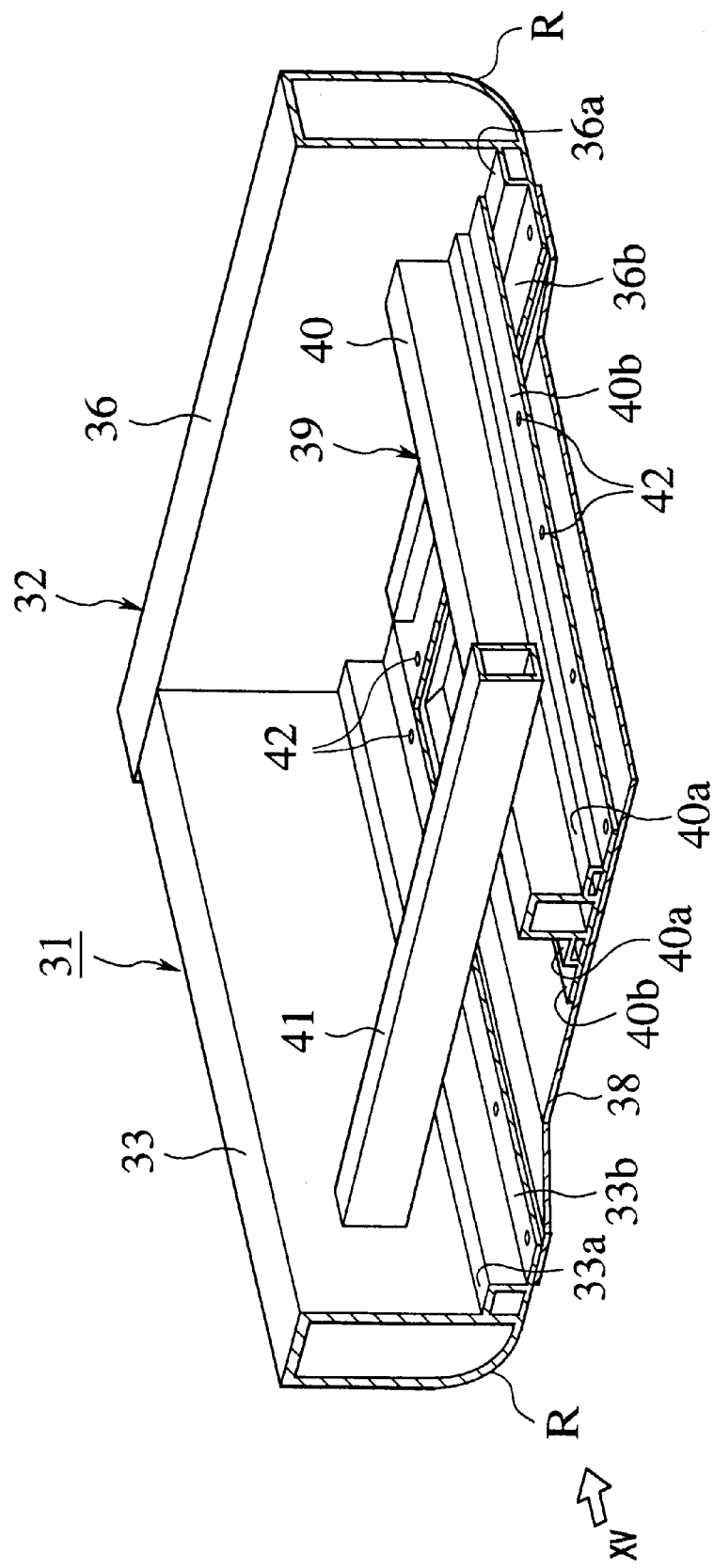
FIG. 14 is a perspective view showing a connection of a front frame with a right frame element of FIG. 12.
Figure 15:
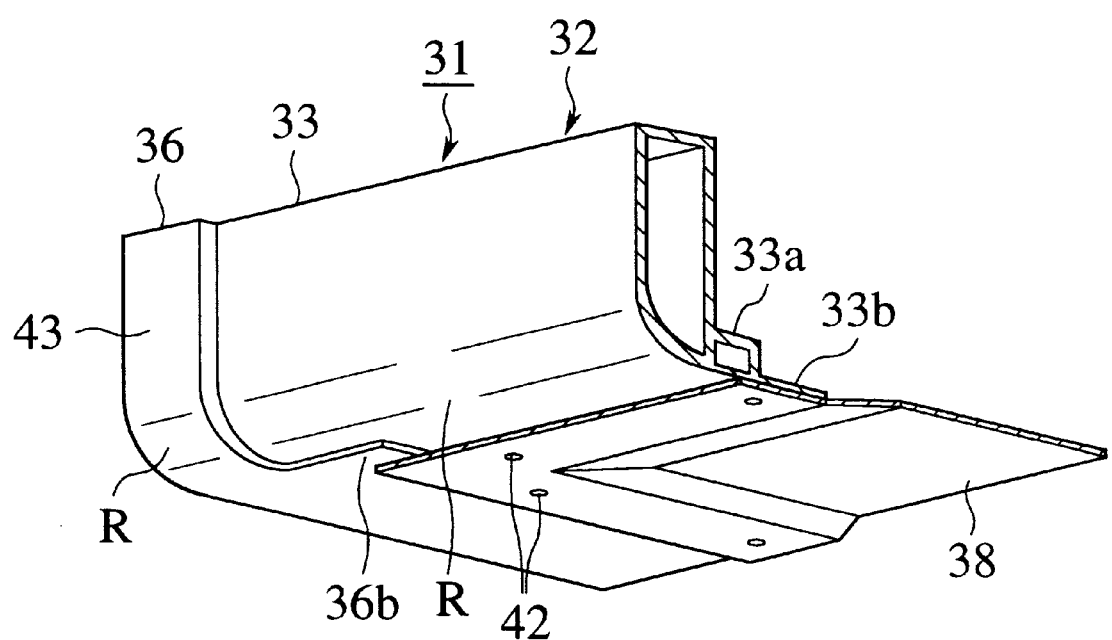
FIG. 15 is a view in the direction of arrow XV of FIG. 14.

As shown in FIGS. 13 and 14, the transverse frame elements 40 of the inner frame 39 have respective ends mounted on the frame-mounting shelves 37a of the center frame 37 and the frame-mounting shelves 35a and 36a of the left and right frame elements 35 and 36. With such an arrangement, the respective end faces of the frame elements 40 are positioned against the side faces of the frame elements 35 and 36, and the frame elements 40 are welded to the center frame 37 and the left and right frame elements 35 and 36.

The transverse frame elements 40 are provided at respective lower edges of opposing side walls thereof with frame-mounting shelves 40a of closed section, which are level with the frame-mounting shelves 33a and 34a, respectively. Being formed to extend in the longitudinal direction of the frame elements 40, the frame-mounting shelves 40a are provided at respective lower edges thereof with flanges 40b which are also on the same level with the bottom face of the battery frame 31. The flanges 40b overlap the raised center portions of the bottom plates 38 and are secured thereto by the above mechanical clinching means 42.

The longitudinal frame elements 41 of the inner frame 39 are arranged on the transverse frame elements 40 perpendicularly. The respective end faces of the frame elements 41 are abutted against the side faces of the front and rear frame elements 33 and 34, and the peripheries of the end faces are welded to the side faces. Further, at an overlapping portion of each frame element 41 with the frame elements 40, both of side edges of the frame element 41 are welded on the frame elements 40.

The batteries B are accommodated in spaces within a lattice formed by the inner frames 39. In the vicinity of the frame elements 33 and 34, the batteries B are supported on the battery-mounting shelves 33a, 34a and 40a and fixed thereto by clamping means (not shown). On the other hand, in the central section of the battery frame 31, they are supported on the battery-mounting shelves 40a of the frame elements 40 and fixed thereto by similar clamping means.

On the other hand, the outer frame 32 and the front frame element 33 are respectively provided at front lower edges thereof with rounded chamfers R. Also, the rear frame element 34 is provided at a rear lower edge thereof with a rounded chamfer R.

Similarly, the respective ends of the left and right frame elements 35 and 36 are closed by end plates 43. Further, the left and right frame elements 35 and 36 are provided at respective lower edges thereof on the front and rear sides with rounded chamfers R. Again, the left and right frame elements 35 and 36 are provided at respective lower edges of outer side walls thereof with rounded chamfers R.

As mentioned above, each bottom plate 38 which overlaps the flanges 33b, 34b, 35b and 36b and the flange 37b of the center frame 37 and is secured thereto, is step-shaped so that the central portion is higher than the peripheral fixed portion by an appropriate value, whereby the height H of the bottom plate 38 from the road surface is established to be greater that of the outer frame 32 or the center frame 37. Therefore, if the battery frame 31 interferes with the road surface during the vehicle's travel, the bottom surfaces of the outer frame 32 and the center frame 37 are brought into contact with the road surface in advance. A driver of the vehicle can feel the interference with the road surface and begin an emergency stop of the vehicle. Accordingly, it is possible to avoid the interference of the bottom plates 38 with the road surface, so that the damage to the batteries B can be prevented.

On the other hand, with the inner frame 39 dividing the space between the outer frame 32 and the center frame 37, and with the longitudinal frame elements 41 are arranged on the vehicle-width directional frame elements 40, a plurality of spaces are defined around frame elements 40 and 41, so that it is possible to promote the flow of cooling fluid introduced through the front side of the battery frame 31. In addition, it is possible to direct cooling fluid along the frame elements 41 backward and smoothly, whereby the cooling effect on the batteries B can be remarkably improved.

At each intersection with the frame element 40, each frame element 41 has the lower edges on both sides welded on the upper surface of the frame element 40. It is possible to shorten the welding spans required for assembling the lattice of the frame elements in comparison with the other lattice arrangement of identical level where either the periphery of the end surface of the frame elements 41 are welded on the front surface of the frame element 40 or the periphery of the end surface of the frame elements 40 are welded on the side surface of the frame element 41. Consequently, it is possible to reduce the torsion of frame due to welding strain of the inner frame 39 thereby to increase the forming accuracy of the battery frame 31. In addition, coordinating the upper face of the battery frame 31 with a battery cover or the vehicle floor (not shown) improves sealing capability the therebetween.

Furthermore, according to the fifth embodiment, since the even quadrilateral outer frame 32 is provided by peripherally welding the end surfaces of the longitudinal frame elements 33 and 34 with the side surfaces of the left and right frame elements 35 and 36, it is possible to decrease a number of joints between the frame elements 33, 34 and the frame elements 35, 36. This also reduces the torsion of the outer frame 32 due to its welding stress. Therefore, the forming accuracy of the battery frame 31 can be also improved.

Additionally, owing to the rounded chamfers R formed on the circumferential lower edges of the outer frame 32, especially the front and rear frame elements 33 and 34, it is possible to avoid the "flying-up" phenomenon of water, which is caused by the vehicle traveling forward or backward on a road covered with water, due to the chamfers' downward guiding of water. Therefore, it is possible to prevent the battery frame 31 from being submerged by the water thereby improving the sealing capability.

Again, owing to the rounded chamfer R formed on the front lower edge of the front frame element 33, it allows the air flow under the vehicle floor to be passed along the under surface of the battery frame 31 smoothly when the vehicle travels at high speed, whereby an aerodynamic characteristic under the vehicle floor can be further improved.

It is noted that, although the battery frame 31 in the above-mentioned embodiment has two pieces of bottom plates 38 arranged on both sides of the center frame 37, a single bottom plate may be applicable in a modification.

What is claimed is:

1. A battery support structure for electric vehicles comprising:
    a pair of spaced longitudinal outer frame elements;
    a pair of spaced transverse outer frame elements joined to said longitudinal outer frame elements to form an outer frame;
    a bottom plate joined to the outer frame and closing at least a portion of the bottom thereof;
    an air inlet formed adjacent a bottom edge of one of said transverse outer frame elements and above the bottom plate;
    an air outlet formed adjacent a top edge of the other of said transverse outer frame elements;
    a plurality of longitudinal inner frame elements disposed within and extending longitudinally of said outer frame, said longitudinal inner frame elements being spaced apart to accommodate batteries therebetween and prevent lateral shifting of the batteries; and
    a plurality of transverse inner frame elements disposed within and extending transversely of said outer frame and supported on said longitudinal inner frame elements, said transverse inner frame elements each having a pair of opposed sides with a single laterally extending battery support flange along the entire length of each side and below the top edge thereof, and being spaced apart to permit batteries to rest on said flanges of adjacent transverse inner frame elements, above said bottom plate, and prevent longitudinal shifting of the batteries, whereby air entering said air inlet can circulate beneath and upwardly over the batteries before exiting through said air outlet.

2. A battery support structure according to claim 1, wherein each of said longitudinal inner frame elements has recesses in the top thereof, and said transverse inner frame elements are supported in said recesses.

3. A battery support structure according to claim 2, wherein said battery support flanges are disposed below the tops of said longitudinal inner frame elements, said longitudinal inner frame elements being spaced apart to permit batteries to lie close to the sides thereof to prevent lateral shifting of the batteries.

4. A battery support structure according to claim 3, wherein each of said transverse outer frame elements has an inwardly projecting flange at the same level as the flanges on said transverse inner frame elements for supporting batteries adjacent said transverse outer frame elements.

5. A battery-powered electric vehicle having a floor panel and a battery support structure beneath the floor panel for supporting an array of batteries with clearances therebetween, the support structure comprising:
    a pair of spaced longitudinal outer frame elements beneath said floor panel;
    a pair of spaced transverse outer frame elements beneath said floor panel joined to said longitudinal outer frame elements to form an outer frame;
    a bottom plate joined to the outer frame and closing at least a portion of the bottom thereof so as to form with said floor panel and said outer frame a battery compartment, said battery compartment having an air inlet and an air outlet whereby cooling air can circulate around the batteries;
    an air inlet formed adjacent a bottom edge of one of said transverse outer frame elements and above the bottom plate;
    air outlet formed adjacent a top edge of the other of said transverse outer frame elements;
    a plurality of longitudinal inner frame elements disposed within and extending longitudinally of said outer frame, said longitudinal inner frame elements being spaced apart to accommodate batteries therebetween and prevent lateral shifting of the batteries; and
    a plurality of transverse inner frame elements disposed within and extending transversely of said outer frame and supported on said longitudinal inner frame elements, said transverse inner frame elements each having a pair of opposed sides with a single laterally extending battery support flange along the entire length of each side and below the top edge thereof, and being spaced apart to permit batteries to rest on said flanges of adjacent transverse inner frame elements, above said bottom plate, and prevent longitudinal shifting of the batteries, whereby air entering said air inlet can circulate beneath and upwardly over the batteries before exiting through said air outlet.

6. A battery-powered electric vehicle according to claim 5, wherein each of said longitudinal inner frame elements has recesses in the top thereof, and said transverse inner frame elements are supported in said recesses.

7. A battery-powered electric vehicle according to claim 6, wherein said battery support flanges are disposed below the tops of said longitudinal inner frame elements, said longitudinal inner frame elements being spaced apart to permit batteries to lie close to the sides thereof to prevent lateral shifting of the batteries.

8. A battery-powered electric vehicle according to claim 7, wherein each of said transverse outer frame elements has an inwardly projecting flange at the same level as the flanges on said transverse inner frame elements for supporting batteries adjacent said transverse outer frame elements.

9. A battery-powered electric vehicle according to claim 8, wherein said air inlet is located near the bottom of said battery compartment, and said air outlet is located near the top of said battery compartment, whereby air entering said air inlet can circulate beneath, upwardly between and over said batteries before exiting through said air outlet.

* * * * *